United States Patent
Kumar et al.

(10) Patent No.: US 10,432,500 B2
(45) Date of Patent: Oct. 1, 2019

(54) DEBUGGER FOR WIRELESS SENSOR NETWORKS

(71) Applicant: Atmel Corporation, San Jose, CA (US)

(72) Inventors: Vinoth Kumar, Chennai (IN); Srivatsan Muralidharan, Chennai (IN); Praveen Babu Reddy Muthulingam, Chennai (IN); SubbaReddy Mulamreddy, Chennai (IN)

(73) Assignee: Atmel Corporation, San Jose, CA (US)

( * ) Notice: Subject to any disclaimer, the term of this patent is extended or adjusted under 35 U.S.C. 154(b) by 431 days.

(21) Appl. No.: 14/936,549

(22) Filed: Nov. 9, 2015

(65) Prior Publication Data

US 2017/0134258 A1    May 11, 2017

(51) Int. Cl.
| | |
|---|---|
| *H04L 12/751* | (2013.01) |
| *H04L 12/24* | (2006.01) |
| *H04W 40/24* | (2009.01) |
| *H04L 12/801* | (2013.01) |
| *H04L 12/26* | (2006.01) |

(52) U.S. Cl.
CPC ............. *H04L 45/02* (2013.01); *H04L 41/12* (2013.01); *H04L 41/22* (2013.01); *H04W 40/24* (2013.01); *H04L 43/0817* (2013.01); *H04L 47/11* (2013.01)

(58) Field of Classification Search
CPC ......... H04L 43/08; H04L 41/22; H04L 45/02; H04L 41/12; H04W 84/18; H04W 40/24
See application file for complete search history.

(56) References Cited

U.S. PATENT DOCUMENTS

| | | | | |
|---|---|---|---|---|
| 2001/0037493 | A1* | 11/2001 | Herman | G06F 11/3604 717/128 |
| 2003/0105767 | A1* | 6/2003 | Sonoda | G06F 3/0619 |
| 2010/0026686 | A1* | 2/2010 | Koo | H04L 41/12 345/440 |
| 2010/0077286 | A1* | 3/2010 | Guagenti | H04L 1/1867 715/205 |
| 2013/0159548 | A1* | 6/2013 | Vasseur | H04L 45/125 709/239 |
| 2015/0289187 | A1* | 10/2015 | Du | H04W 4/02 455/439 |

* cited by examiner

*Primary Examiner* — Kevin C. Harper
(74) *Attorney, Agent, or Firm* — Fish & Richardson P.C.

(57) ABSTRACT

In an embodiment, a method of debugging a wireless sensor network comprises: initiating, by a server node over a wireless medium, a single debugging session with a plurality of nodes of the wireless sensor network; receiving, by the server node over the wireless medium, network topology information from the nodes; and presenting, by a display device coupled to the server node, a network topology view constructed from the topology information, the network topology view including a graphical representation of each node in the topology.

18 Claims, 8 Drawing Sheets

DEBUGGER FOR WIRELESS SENSOR NETWORKS

TECHNICAL FIELD

The subject matter of this disclosure relates generally to debugging wireless sensor networks.

BACKGROUND

Large scale wireless sensor networks are difficult to debug efficiently. In some wireless sensor networks hundreds of nodes are networked together and require a means to observe system performance and debug any node that fails. Collecting statistics on nodes and performing remote software upgrades on nodes often requires additional hardware like a debugger or programmer. Depending on how the wireless sensor network was deployed, attaching a debugger or programmer to a node may not be possible due to inaccessibility of the node.

SUMMARY

In an embodiment, a method of debugging a wireless sensor network comprises: initiating, by a server node over a wireless medium, a single debugging session with a plurality of nodes of the wireless sensor network; receiving, by the server node over the wireless medium, network topology information from the nodes; and presenting by a display device a network topology view constructed from the topology information, the network topology view including a graphical representation of each node in the topology.

In an embodiment, a method of debugging a wireless sensor network comprises: initiating, by a server node over a wireless medium, a single debugging session with a plurality of nodes of the wireless sensor network; receiving, by the server node over the wireless medium, node information from a plurality of nodes in the wireless sensor network; presenting, by a display device coupled to the server node, a view including the node information; and receiving input selecting an option in the view.

In an embodiment, a system for debugging a wireless sensor network comprises: initiating a single debugging session with a plurality of nodes of the wireless sensor network; receiving network topology information from the nodes; and presenting a network topology view constructed from the topology information, the network topology view including a graphical representation of each node in the topology.

In an embodiment, a system for debugging a wireless sensor network comprises: initiating a single debugging session with a plurality of nodes of the wireless sensor network; receiving node information from a plurality of nodes in the wireless sensor network; presenting a view including the node information; and receiving input selecting an option in the view.

DETAILED DESCRIPTION

Example System

Figure 1:
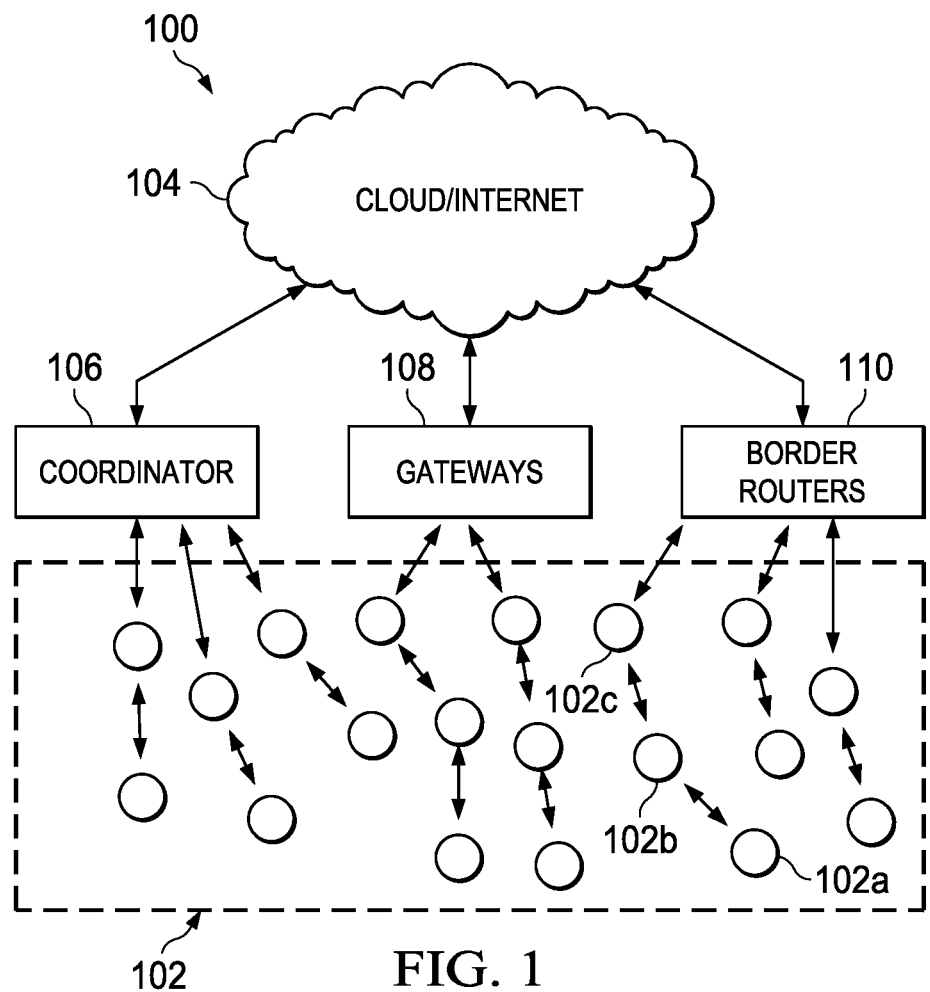
FIG. 1 is a block diagram of an example wireless sensor network, according to an embodiment.

FIG. 1 is a block diagram of an example wireless sensor network 100. In the example embodiment shown, network 100 includes nodes 102, coordinator 106, gateways 108 and border routers 110. Coordinator 106 (e.g., a coordinator in a ZigBee network), gateways 108 and border routers 110 are optional network nodes that are configured to redirect information from nodes 102 to, for example, wide area network (WAN) 104 (e.g., the Internet, private network). Nodes 102 form a network topology (e.g., a mesh network) in which each node relays data for the network and all nodes cooperate in the distribution of data in network 100. For example, network 100 can route a message between individual nodes 102*a*, 102*c*, by "hopping" from node 102*a* to node 102*b* and then to its destination node 102*c*. To ensure path availability, network 100 can reconfigure itself around broken paths using, for example, a self-healing algorithm (e.g., shortest path bridging algorithm).

Debugging network 100 is typically done by connecting a debugger, such as a hardware debugger or programmer (e.g., a personal computer with a debugging application), to individual nodes 102 in network 100 through a wired medium (e.g., RS232, Ethernet, JTAG, etc.). Debugging includes but is not limited to observing or monitoring network performance, generating statistics, recording traces, setting or resetting variables and upgrading firmware or software on nodes. Debugging using a wired medium becomes challenging when network 100 includes hundreds of nodes 102. For example, some of nodes 102 may not be physically accessible to connect a hardware debugger/programmer. Also, performing separate debug sessions on hundreds of nodes, rather than a single debug session for all the nodes makes it more difficult to detect systemic errors that effect all the nodes in the network. If a bug is detected, hundreds of nodes may need to receive a firmware/software upgrade to correct the bug. Using a hardware debugger to upgrade hundreds of nodes over wired medium can take a long time and could result in all or a portion of a network becoming inoperable for a period of time while the upgrades are deployed and tested.

Figure 2:
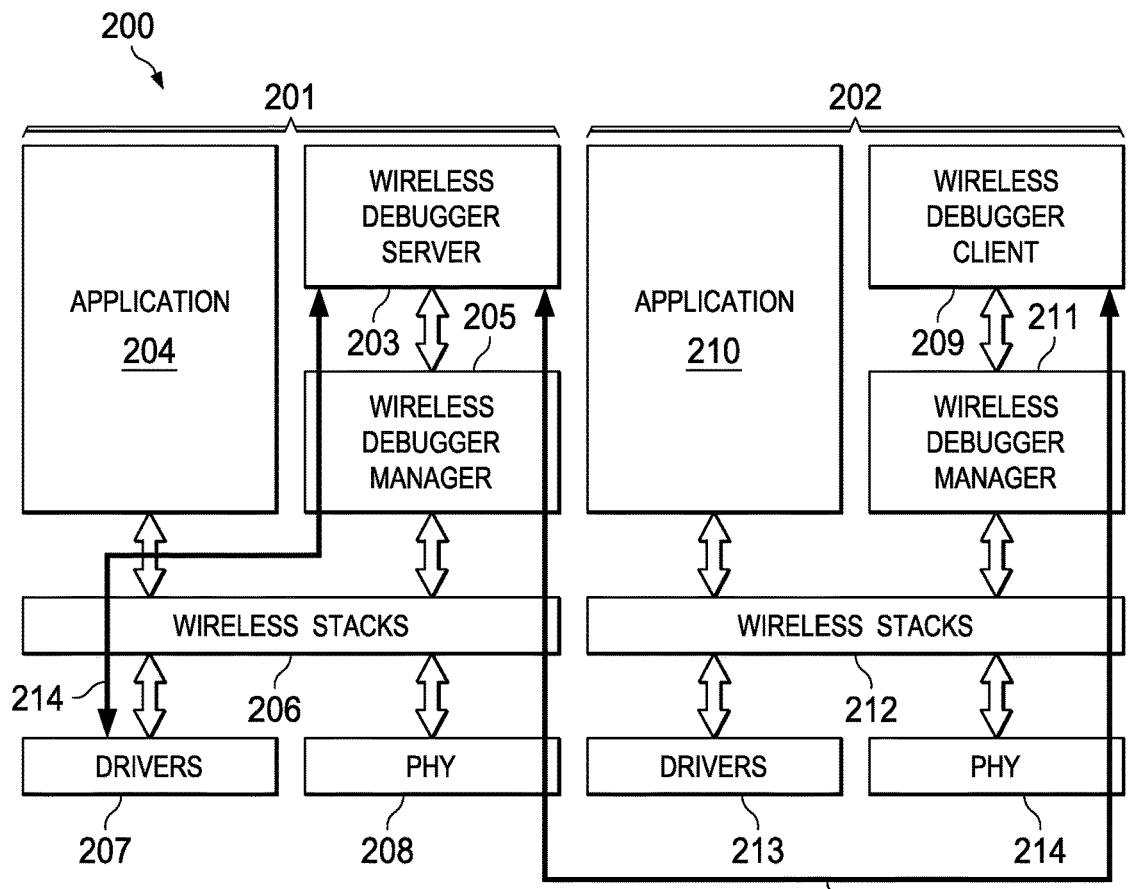
FIG. 2 is a block diagram of an example software architecture for client and server nodes in the wireless sensor network, according to an embodiment.

FIG. 2 is a block diagram of an example software architecture 200 for client and server nodes 102 in network 100. In the example embodiment shown, architecture 200 includes server stack 201 and client stack 202. Any one of nodes 102 in network 100 can be configured to include server stack 201 (also referred to as a server node) or client stack 202 (also referred to as a client node). Stacks 201, 202 are instrumented to support: 1) debugging through a wireless channel without the need for additional hardware debuggers or programmer; 2) connecting many nodes in a single debug session; 3) end-to-end network visibility down to end-devices like sensors/actuators; 4) special memory segments that can be observed after node crash, along with methods to correlate stack trace dumps with files, up-to function name and its exact address; and 5) Over-the-Air (OTA) upgrades with new firmware images post bug-fixes/changes.

In the example embodiment shown, server stack 201 includes wireless debugger server 203 (WiDBG-server 203), application 204, wireless debugger manager 205, wireless stack 206, drivers 207 and physical layer (PHY) 208. Client stack 202 includes wireless debugger client 209 (WiDBG-client 209), application 210, wireless debugger manager 211, wireless stack 212, drivers 213 and PHY layer 214. An example communication flow between stacks 201, 202 is represented by arrows 214, 215.

Applications 204, 210 reside in the highest layers of the Open Systems Interconnection model (OS model) and can be implemented by an end-user. Functionality of applications 204, 210 can be supported by lower layers of the OSI model, such as wireless stacks 206, 212. WiDBG-server 203 and WiDBG-client 209 reside in the same layer of the OSI model as applications 204, 210, and provide debug features that are at least partially supported by lower layers such as wireless stacks 206, 212. Having applications 204, 210 and WiDBG-server 203 and WiDBG-client 209 at the same layer in the OSI model allows applications 204, 210 to debug themselves using WiDBG-server 203 and WiDBG-client, respectively.

In an embodiment, WiDBG-server 203 and WiDBG-client 209 are configured to exchange messages with each other through wireless stacks 206, 212 to support various debug features. Additionally, WiDBG-client 209 can be configured to provide information requested by WiDBG-server 203 to, for example, plot end-to-end network topology on a display device to assist a user in debugging. Upon a request by WiDBG-server 203 or periodically (based on the configuration in WiDBG-client 209), each node in the network topology sends its router address (e.g., MAC address) and the router address of the next parent node (next "hop"), which can be used to construct a network topology.

In an embodiment, WiDBG-server 203 configures and upgrades client nodes through wireless stacks 206, 212. WiDBG-server 203 can request client nodes to read/write variables in memory in the client nodes with absolute memory addresses. The absolute address (also called a real or machine address) is a fixed address in memory. The term absolute address distinguishes it from a relative address, which indicates a memory location by specifying an offset from another memory address. In an embodiment, the absolute memory address of the variable can be retrieved from, for example, an executing and linking format (ELF) file or using ELF with a debugger application, such as the open source and publicly available GNU debugger (GDB). ELF provides a set of binary interface definitions that extend across multiple operating environments to reduce the number of different interface implementations, thereby reducing the need for recoding and recompiling code.

In an embodiment, WiDBG-client 209 stores log and trace information along with one or more function addresses in memory (e.g., RAM). WiDBG-server 203 can request WiDBG-client 209 to retrieve log and trace information or the same can be sent by WiDBG-client 209 periodically. In an embodiment, using an ELF file together with a debugger application (e.g., GDB), the absolute addresses of functions logged can be translated to human-readable function names along with log messages to facilitate debugging by a user.

In an embodiment, a debugger running on a personal computer (PC) coupled to WiDBG-server 203 fetches memory addresses on WiDBG client 209. In another embodiment, WiDBG-client 209 includes a real-time operating system (RTOS) that can be configured by WiDBG-server 203 to run a debugger application. In the RTOS embodiment, developers can use the debugger to place breakpoints in kernel code, step through the code and observe one or more variables. On architectures where hardware debugging registers are available, watch points can be set which trigger breakpoints when specified memory addresses are executed or accessed.

In an embodiment, WiDBG manager 205, 211 handles abstraction from wireless stacks 206, 212 and hardware functionalities resulting in a stack-independent implementation of WiDBG-server 203 and WiDBG-client 209.

In an embodiment, driver layers 207, 213 provide software drivers for facilitating communication between nodes or nodes and hardware debuggers using communication channels that comply with one or more wired communication protocols (e.g., UART, Ethernet, CAN) or wireless communication protocols (e.g., IEEE 802.15.4, WiFi, Bluetooth).

In an embodiment, PHY layers 208, 214 represent the physical layers of the OSI model. In an embodiment, PHY layers 208, 214 represent circuits and/or firmware that establish and terminate connections between two directly connected nodes over wired or wireless communications mediums, including implementing protocols for flow control, transmission mode (e.g., simplex, half duplex, full duplex) and network topology (e.g., bus, mesh, star, ring).

Example Processes

Figure 3:
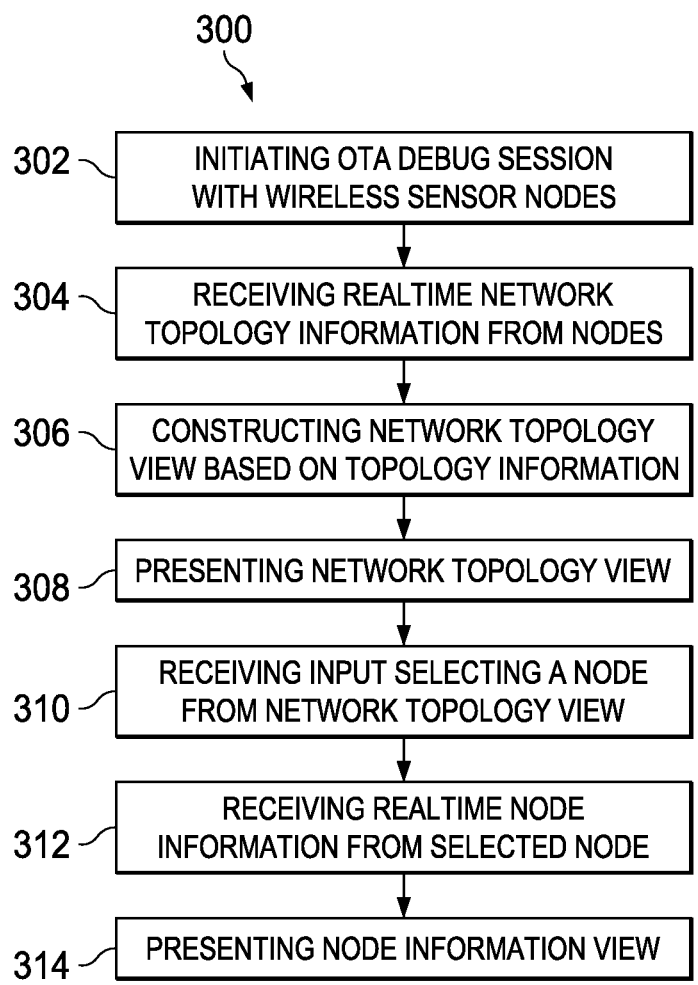
FIG. 3 is a flow diagram of an example process performed by a server node in a wireless sensor network, according to an embodiment.

FIG. 3 is a flow diagram of an example process 300 performed by a server node in a wireless sensor network, according to an embodiment. Process 300 can be implemented by, for example, the system architecture 1100 described in reference to FIG. 11.

In an embodiment, process 300 can begin by initiating an OTA debug session with client nodes (302). For example, the server node can run the debugger application internally and fetch the information from the memory of a client node. In another embodiment, a server node can request a client node to run a debugger application deployed on the client node, as described in reference to FIG. 2.

Process 300 can continue by receiving a real-time or "live" network topology information from the nodes (304). For example, in response to a request from the server node, each client node in the network topology can send its router address (e.g., MAC address) and the router address for the next "hop" node and parent node in the network topology.

Process 300 can continue by generating a network topology view based on the topology information (306) and presenting the network topology view on a display device (308). For example, the network topology view can be presented on a display device (e.g., a computer monitor), as described in reference to FIG. 6.

Process 300 can continue by receiving input selecting a node from the network topology view (310) and receiving real-time node information from the selected node (312).

For example, when a user selects a node, a request for variables or other information can be sent by a server node to the selected client node. Upon receipt of the request, node information (e.g., a trace recording, variables) are sent to the server node, as described in reference to FIG. 3. In an embodiment, the server node can translate variable names or function names to absolute addresses associated with the stack running on the client node based on the "ELF" file output from compiled code running on the client node.

Process 300 can continue by presenting a node information view on a display device coupled to the client node (314) to facilitate debugging of the client node by a user, as described in reference to FIGS. 6-10.

Figure 4:
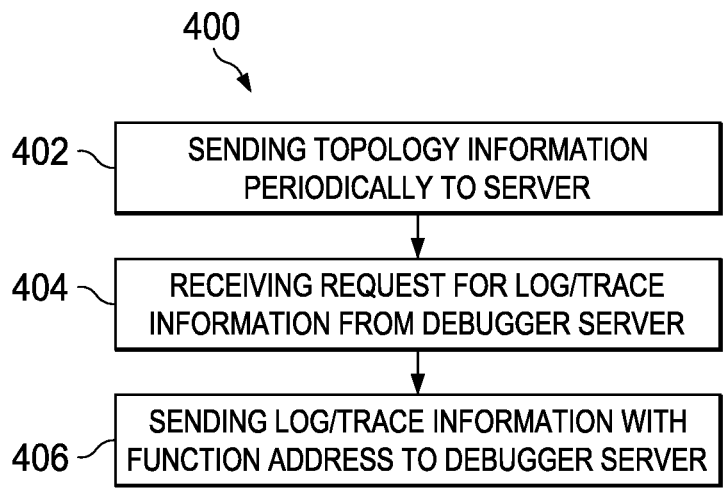
FIG. 4 is a flow diagram of an example process performed by a client node in a wireless sensor network, according to an embodiment.

FIG. 4 is a flow diagram of an example process 400 performed by a client node in a wireless sensor network, according to an embodiment. Process 400 can be implemented by, for example, the system architecture 1100 described in reference to FIG. 11.

In an embodiment, process 400 can begin by sending topology information periodically to a server node (402).

Process 400 can continue by receiving a request for log/trace information from the server node (404). The request can be generated using one or more view elements as described in reference to FIGS. 6-10.

Process 400 can continue by sending log/trace or other node information with a function address to the server node (408). For example, a function address can be translated or mapped into a human-readable function name at the PC connected to the server node after it is sent from the client node to facilitate debugging by a user.

Figure 5:
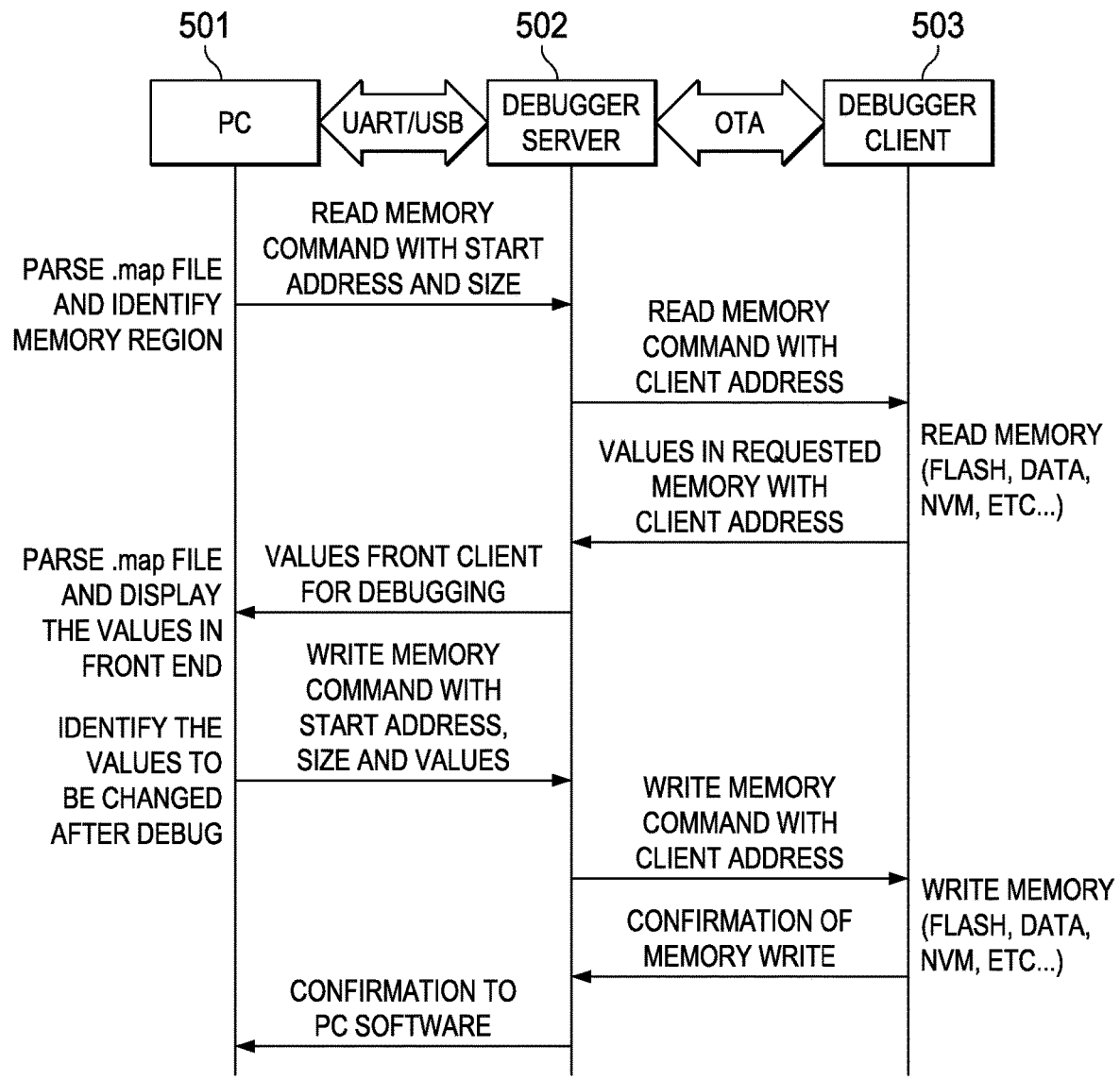
FIG. 5 is a diagram illustrating an example sequence flow for debugging a client node in a wireless sensor network.

FIG. 5 is a diagram illustrating an example sequence flow for debugging a node in a wireless sensor network. In an implementation, debugger hardware or programmer is coupled by a wired or wireless connection to a debugger server and initiates read/write commands to fetch variables from memory in the client node for debugging purposes.

In the example embodiment shown, personal computer (PC) 501 is wired to debugger server 502 in a server node (e.g., WiDBG-server 203) using a wired or wireless connection. A debugging application running on PC 501 identifies a memory region storing variables to be read/changed. PC 501 sends a read memory command with a start address and size of the memory region to debugger server 502. Debugger server 502 sends a read memory command with the memory address to debugger client 503 (e.g., WiDBG-client 209) on the client node. In response to the command, debugger client 503 reads the value(s) stored at the specified memory address and sends the value(s) to debugger server 502, which in turn sends the value(s) to the debugging application running on PC 501. The debugging application can display the variables in, for example, a view that also allows a user to edit the variables, such as the view described in reference to FIG. 7.

After a user identifies values to be changed using the debugging application, PC 501 sends a write command to debugger server 502 with a start address and size of a memory region storing the variables to be changed. Debugger server 502 sends a write command with the memory address to debugger client 503. Debugger client 503 writes the new variables to the memory region defined by the address and sends a confirmation of the memory write to debugger server 502. Debugger server 502 sends a write memory confirmation to the debugger application running on PC 501 so that the user can confirm that the variables were successfully changed.

Example Debugger Application Views

In an embodiment, the wireless debugger system disclosed herein provides a visualization and analysis tool with a graphical front-end for displaying debug information that is being provided by software stacks 201, 202 on nodes in a wireless sensor network. The tool provides overall topology and upgrade views as well as per node views. The overall network topology and upgrade views display the network operation (e.g., nodes and their roles, routes) and allows individual nodes to be selected by a user to get key information about the node (e.g., current state, malfunctioning state, address identifier, RSSI/LQI, statistics, aging in the network). When the user selects an icon representing a node in the network topology view, a detailed view about the node is displayed that includes a facility to fetch key statistics live from the node. In the event of a node malfunctioning or in operating in an error state, the per node views allow a user to fetch a system trace recording. Specific examples of views will now be described in reference to FIGS. 6-10.

Figure 6:
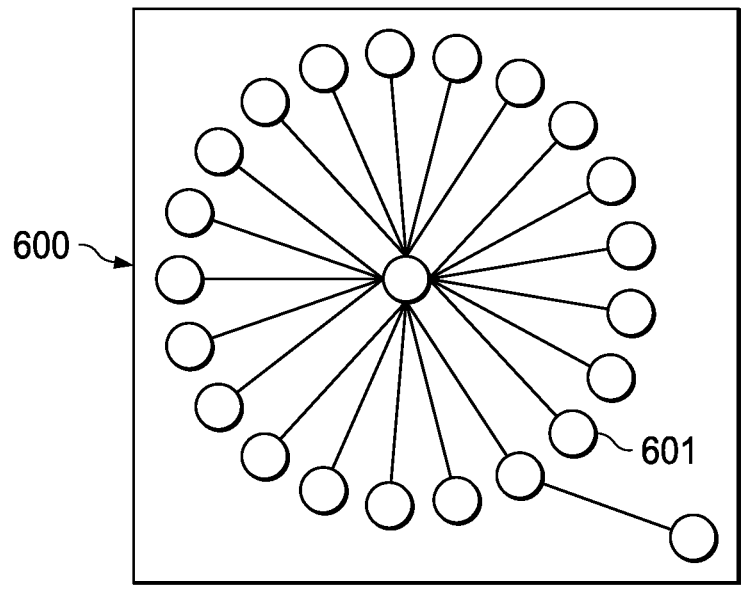
FIG. 6 is an example network topology view, according to an embodiment.

FIG. 6 is an example network topology view 600 for a wireless sensor network, according to an embodiment. In the example shown, network topology view 600 shows end-to-end visibility along with end nodes 601 in a "star" topology. Other topologies are also possible such as a mesh topology. Client nodes can relay topological information to a server node, such as, for example, next hop/parent, received signal strength indicator (RSSI), link quality indicator (LQI), IEEE addresses, etc. This topological information can be presented in network topology view 600 to assist the user in visualizing the network topology. In an embodiment, network topology view 600 can support LED blinking or other visual highlighting methods to identify an individual node among hundreds of nodes in the topology view 600. In an embodiment, network topology view 600 indicates routes and hops and timing and congestion in the wireless sensor network.

Figure 7:
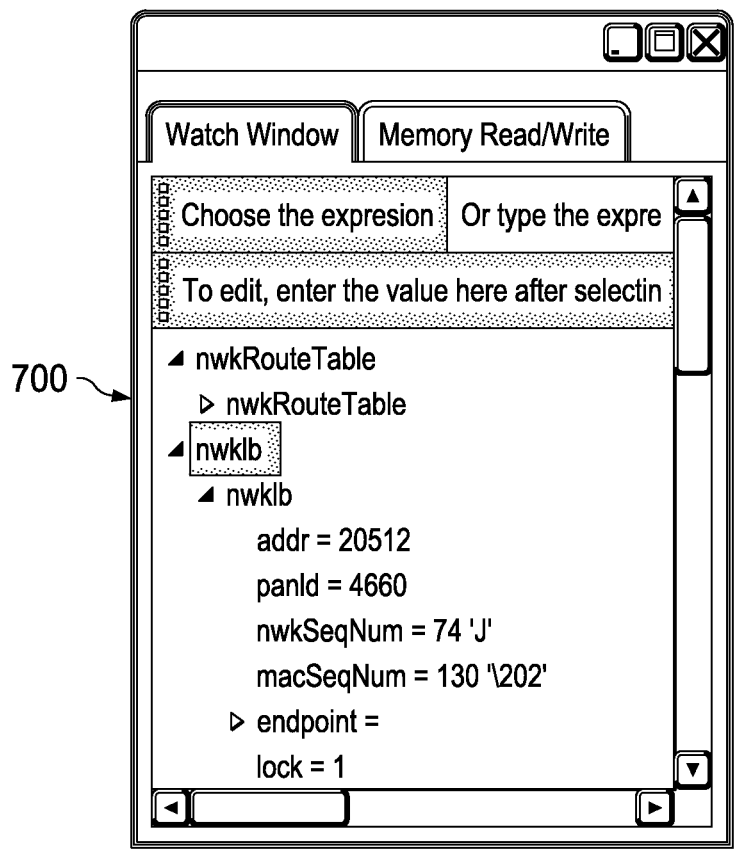
FIG. 7 is an example view for initiating a variable watch window for watch points, according to an embodiment.

FIG. 7 is an example variable watch window 700, according to an embodiment. In the example shown, watch window 700 displays variables for routing table nwkRouteTable in network information base (nwklb). The user can edit these variables through watch window 700 and the system will read/write the edited variables. In an embodiment, a debugger application residing on a client node (e.g., GDB) can extract a variable from a file (e.g., a .elf file) of the firmware used by the client node. The user can change or replace a variable in watch window 900 and then write the variable back into memory of the client node and observe the difference that results from the changed or replaced variable. One or more variables in the network information base, such as the current state of a layer, routing table/neighbor table, etc., can be displayed with more detailed informative to better assist the user in debugging.

Figure 8:
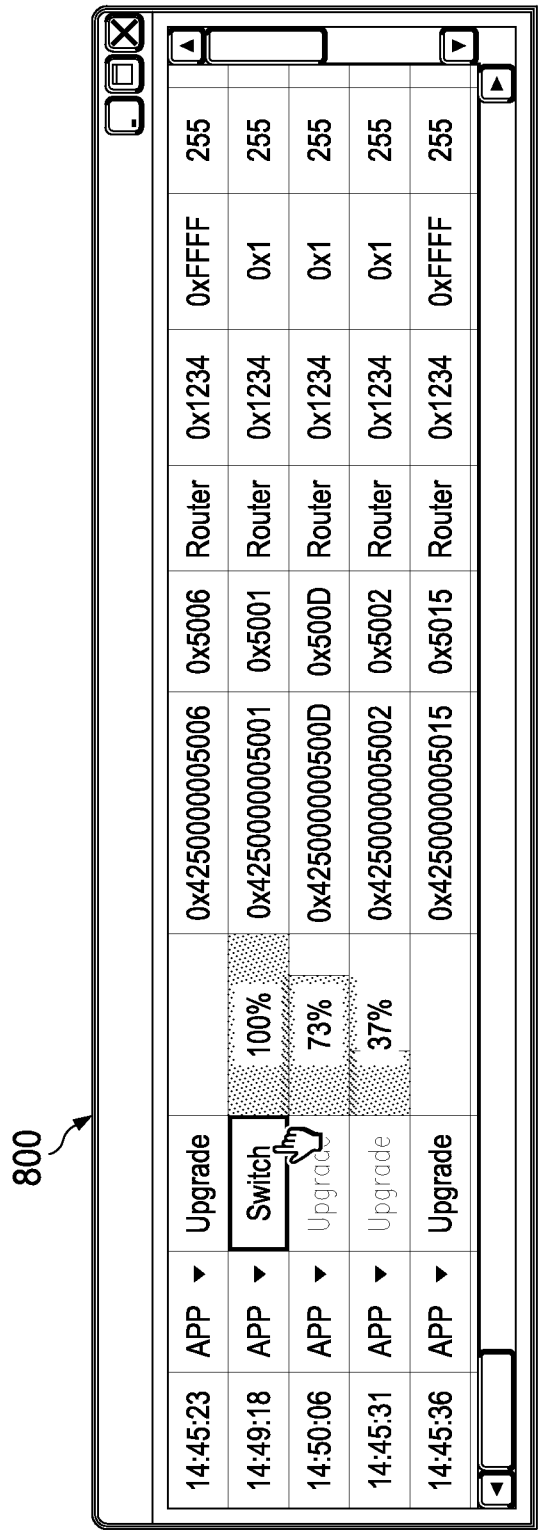
FIG. 8 is an example view for initiating a remote upgrade of a client node in a wireless sensor network, according to an embodiment.

FIG. 8 is an example remote upgrade view 800 for initiating a remote upgrade of a node in a wireless sensor network, according to an embodiment. View 800 includes a number of view elements, including buttons for selecting specific firmware/software for upgrade, progress bars for indicating the progress of the upgrade, buttons for initiating the upgrades and details about the node being updates (e.g., addresses, names). The instrumented wireless stacks 206, 212 (FIG. 2) provide the remote upgrade capability which can be easily integrated on deployed systems. The application level application programming interface (API) of wireless stacks 206, 212 is not changed as a result of the upgrade. The user can remotely install the new stack version on the client node and re-compile using remote upgrade view 800.

Figure 9:
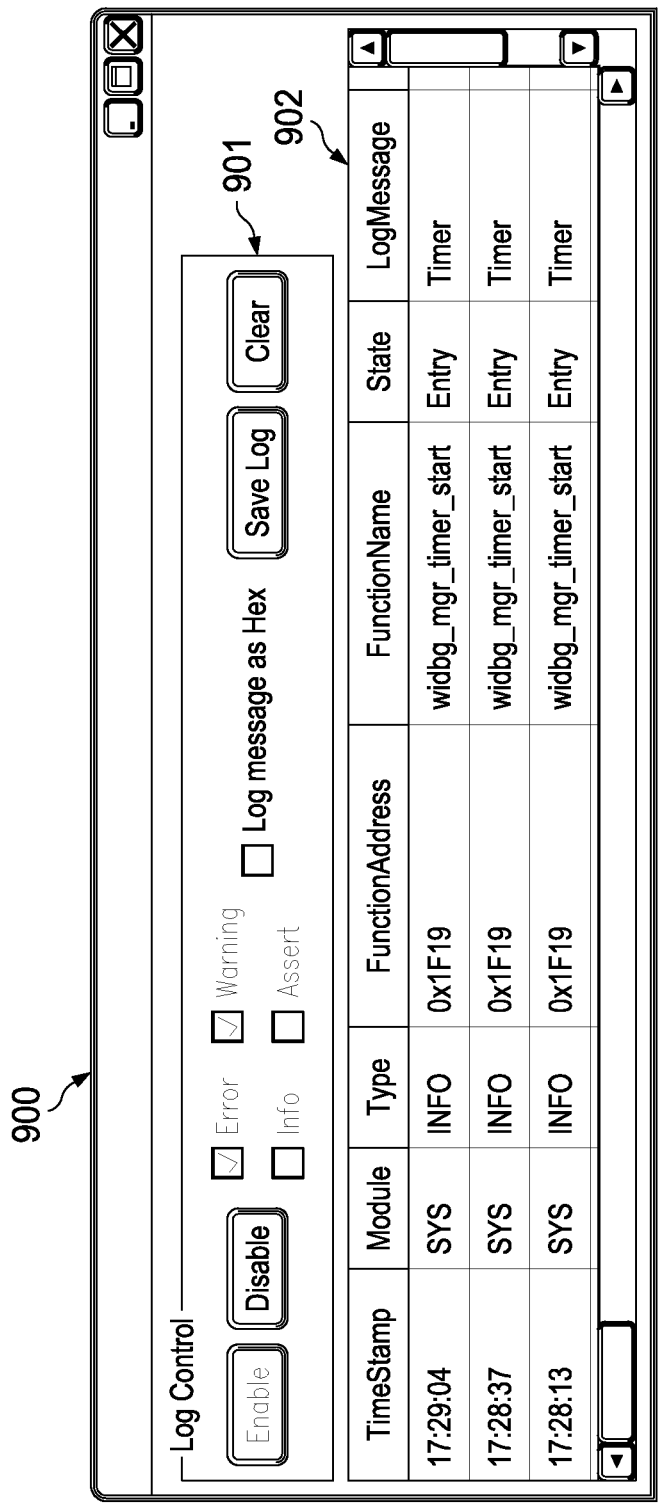
FIG. 9 is an example view for configuring debug log levels, according to an embodiment.

FIG. 9 is an example view 900 for configuring debug log levels, according to an embodiment. View 900 includes log control 901 that allows logs to be saved and cleared and debug log levels to be enabled and disabled using view elements. When enabled, the user can select a desired debug level, which in this example includes: Info, Warning and Assert and Error along with an option to display the Log message as HEX. Log display 902 includes a list of log messages and associated data such as timestamp, module name, type of debug level (e.g., Info), function address, function name, state and log message type (e.g., timer).

Stack 201, 202 in nodes 102 can be enhanced to offer multiple configurable debug log levels as described above. The debug levels can be differentiated based on severity level (e.g., fatal, error, warnings) and detail level (e.g., information, entry/exit function trace, function parameters). A common API can be used for debug log access across the stack and this API can also be extended and made available for applications running on top of the stack. The debug log can include capability to route traces to a port (e.g., a serial port) to support the log messages along with function address without the need for adding function identifiers across the stack.

Figure 10:
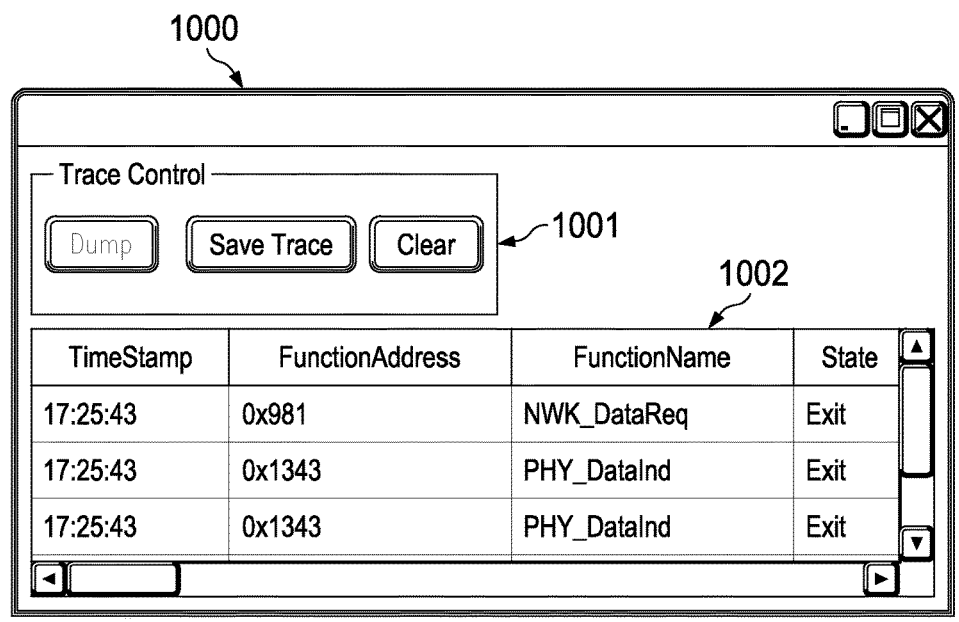
FIG. 10 is an example view for a built-in system trace recorder, according to an embodiment.

FIG. 10 is an example view 1000 for a built-in system trace recorder, according to an embodiment. In the embodiment shown, view 1000 includes trace control 1001 for dumping, saving and clearing a trace recording. A trace list 1002 displays timestamps, function addresses, function names and state information to facilitate debugging by the user. The built-in system trace recorder can log key events/state information of the stack in an internal buffer (e.g., a circular buffer) providing a record for sequence of events/states. This facility allows debugging of stack problems which are timing dependent and where use of verbose traces reduces the reproducibility of a problem. The trace recorder also allows post-mortem analysis (e.g., system hang/crash conditions) to support the trace along with function address without the need for adding function identifiers across the stack.

Example System Architecture

Figure 11:
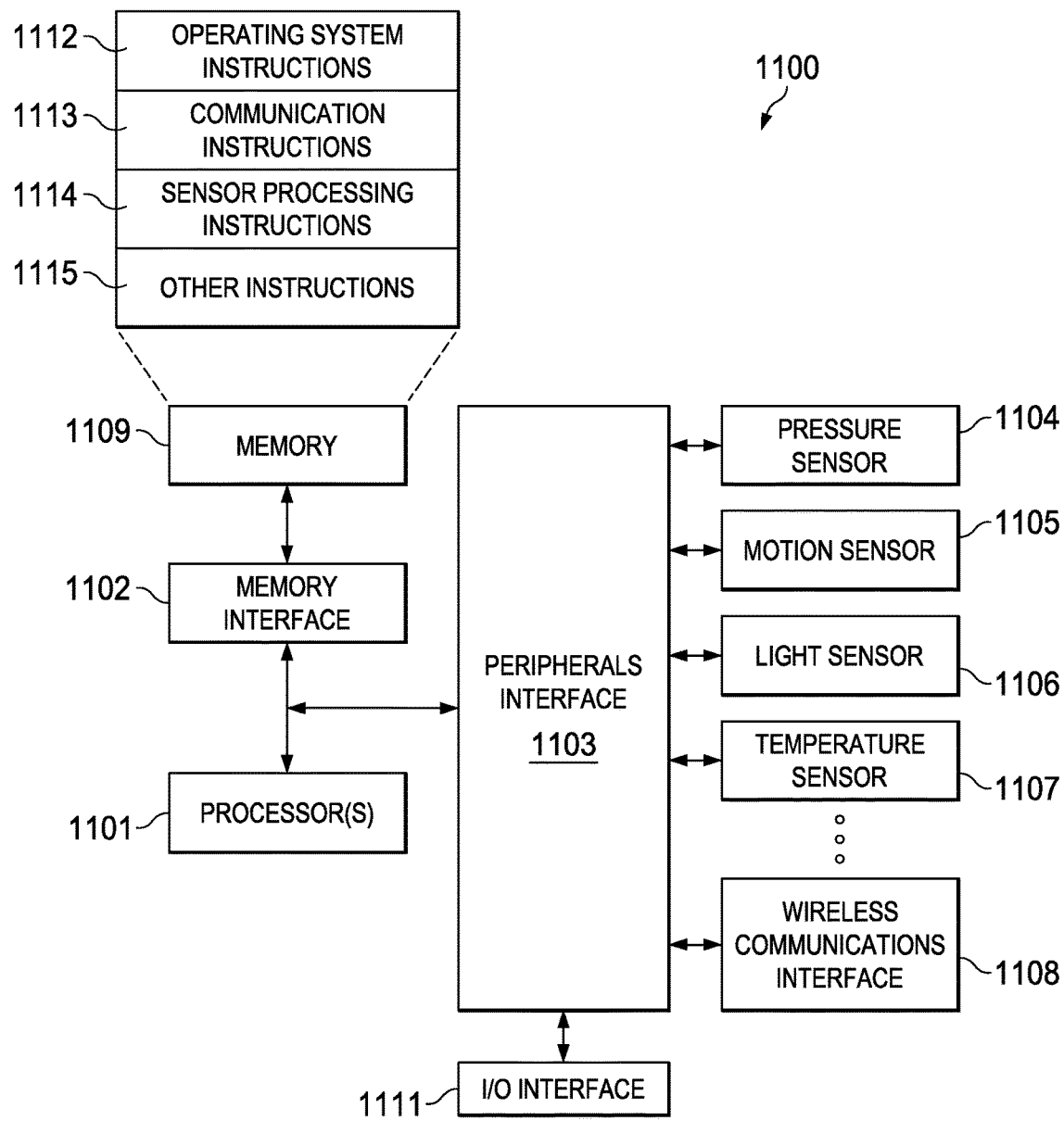
FIG. 11 is a block diagram of example system architecture for a node in a wireless sensor network that can implement the features and processes described in reference to FIGS. 1-10.

FIG. 11 is a block diagram of example system architecture 1100 for a node in a wireless sensor network that can implement the features and processes described in reference to FIGS. 1-10. Architecture 1100 may include processor(s) 1101, memory interface 1102, and peripherals interface 1103. Memory interface 1102, processor(s) 1101 and peripherals interface 1103 may be separate components or may be integrated in one or more integrated circuits. One or more communication buses or signal lines may couple the various components.

Sensors may be coupled to peripherals interface 1103 to facilitate multiple sensing functionalities of a node. For example, pressure sensor 1104, motion sensor 1105, light sensor 1106 may be coupled to peripherals interface 1103. Other sensors may also be connected to peripherals interface 1103, such as temperature sensor 1107 or any other sensor depending on the application implemented by a node. In addition to sensors, actuators may be coupled to peripherals interface 1103.

Wireless communications interface 1108 may include radio frequency (RF) receivers and transmitters (or RF transceivers) and/or optical (e.g., infrared) receivers and transmitters. The specific design and implementation of the wireless communications interface 1108 may depend on the communication network(s) or medium(s) over which the node is intended to operate. For example, a node may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communications interface 1108 may include hosting protocols such that the node may be configured as a base station for other wireless devices. As another example, wireless communication interface may allow the node to communicate or synchronize with a host device (e.g., a personal computer) using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Input/output (I/O) interface 1110 may include circuitry and/or firmware for supporting wired mediums and implement various communication protocols including ports for UART, Serial, USB, Ethernet, RS-232, I2C and the like. For example, I/O interface 1110 can provide one or more ports for a hardware debugger or programmer such as a PC.

Memory interface 1102 may be coupled to memory 1109. Memory 1109 may include high-speed random access memory or non-volatile memory, such as one or more magnetic disk storage devices, one or more optical storage devices, or flash memory (e.g., NAND, NOR). Memory 1109 may store operating system 1112, such as Darwin, RTXC, LINUX, UNIX, OS X, WINDOWS, or an embedded operating system such as VxWorks. Operating system 1112 may include instructions for handling basic system services and for performing hardware dependent tasks. In some implementations, operating system 1112 may include a kernel (e.g., UNIX/LINUX kernel).

Memory 1109 may also store communication instructions 1113 to facilitate communicating with one or more additional nodes in a network topology and one or more computers or servers over wired and wireless mediums. For example, instructions 1113 can include instructions for implementing all or part of stacks 201, 202 shown in FIG. 2.

Memory 1109 may include instructions 1114 to facilitate sensor-related processing and functions and other instructions 1115 for performing some or all of the features and processes, as described in reference to FIGS. 1-10. For example, instructions 1115 can included instructions for applications.

Each of the above identified instructions and applications may correspond to a set of instructions for performing one or more functions described above. These instructions need not be implemented as separate software programs, procedures, or modules. Memory 1109 may include additional instructions or fewer instructions. Furthermore, various functions of the device may be implemented in hardware and/or in software, including in one or more signal processing and/or application specific integrated circuits (ASICs).

While this document contains many specific implementation details, these should not be construed as limitations on the scope of what may be claimed but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A method of debugging a wireless sensor network comprising:
   initiating, by a server node over a wireless medium, a single debugging session with a plurality of client nodes of the wireless sensor network;
   receiving, by the server node over the wireless medium, node information from the client nodes, wherein the node information includes, for each client node of the plurality of client nodes, a first router address for the client node, a second router address for a parent node of the client node, a third router address for a next hop node for the client node and one or more variables used in a stack installed on the client node;
   responsive to a first input, presenting, by a display device coupled to the server node, a network topology view constructed from the node information, the network topology view including a graphical representation of each client node in the topology;
   responsive to a second input, presenting, by the display device, a variable watch window displaying one or more stack variables for a particular client node of the plurality of client nodes;
   responsive to a third input, changing or replacing one or more stack variables in the variable watch window; and
   initiating, by the server node over the wireless medium, the change or replacement of the one or more stack variables on the particular client node.

2. The method of claim 1, further comprising:
   responsive to a fourth input, selecting one of the client nodes in the network topology view;
   responsive to a fifth input, sending a request to a selected client node for additional node information;
   receiving, by the server node over the wireless medium, the additional node information; and
   presenting the additional node information on the display device.

3. The method of claim 1, wherein the network topology view indicates routes and hops in the wireless sensor network.

4. The method of claim 2, wherein the network topology view indicates timing and congestion in the wireless sensor network.

5. The method of claim 2, wherein the additional node information includes event or state information of a stack in the selected client node.

6. The method of claim 2, wherein sending the request to the selected client node for node the additional information and receiving the additional node information further comprises:
   sending a memory read command to the selected client node with a memory address; and
   receiving one or more values from the memory address; and
   sending the one or more values to a hardware debugger or programmer coupled to the server node.

7. A system for debugging a wireless sensor network comprising:
   one or more processors;
   memory coupled to the one or more processors and configured to store instructions, which, when executed by the one or more processors, causes the one or more processors to perform operations comprising:
   initiating over a wireless medium a single debugging session with a plurality of client nodes of the wireless sensor network;
   receiving network node information from the plurality of client nodes, wherein the node information includes, for each client node of the plurality of client nodes, a first router address for the node, a second router address for a parent node of the client node, a third router address for a next hop node for the client node and one or more variables used in a stack installed on the client node;
   responsive to a first input, presenting a network topology view constructed from the node information, the network topology view including a graphical representation of each node in the topology;
   responsive to a second input, presenting, by a display device, a variable watch window displaying one or more stack variables for a particular client node of the plurality of client nodes;
   responsive to a third input, changing or replacing one or more stack variables in the variable watch window; and
   initiating the change or replacement of the one or more stack variables on the particular client node over the wireless medium.

8. The system of claim 7, the operations further comprising:
   responsive to a fourth input, selecting one of the client nodes from the plurality of client nodes in the network topology view;
   responsive to a fifth input, sending a request to the selected client node for additional node information;
   receiving the additional node information; and
   presenting the additional node information on a display device.

9. The system of claim 7, wherein the network topology view indicates routes and hops in the wireless sensor network.

10. The system of claim 7, wherein the network topology view indicates timing and congestion in the wireless sensor network.

11. The system of claim 8, wherein the additional node information includes event or state information of a stack in the selected client node.

12. The system of claim 8, wherein sending the request to the selected client node for the additional node information and receiving the additional node information further comprises:
    sending a memory read command to the selected client node with a memory address; and
    receiving one or more values from the memory address; and
    sending the one or more values to a hardware debugger or programmer coupled to a server device.

13. A non-transitory computer-readable storage medium having instructions stored thereon, which, when executed by one or more processors, causes the one or more processors to perform operations comprising:
    initiating, by a server node over a wireless medium, a single debugging session with a plurality of client nodes of a wireless sensor network;
    receiving, by the server node over the wireless medium, node information from the plurality of client nodes, wherein the node information includes, for each client node of the plurality of nodes, a first router address for the client node and a second router address for a parent node of the client node, a third router address for a next hop node for the client node and one or more variables used in a stack installed on the client node;

responsive to a first input, presenting, by a display device coupled to the server node, a network topology view constructed from the node information, the network topology view including a graphical representation of each client node of the plurality of client nodes in the topology;

responsive to a second input, presenting, by the display device, a variable watch window displaying one or more stack variables for a particular client node of the plurality of client nodes;

responsive to a third input, changing or replacing one or more stack variables in the variable watch window; and initiating the change or replacement of the one or more stack variables on the particular client node over the wireless medium.

14. The non-transitory computer-readable storage medium of claim 13, wherein the operations further comprise:

responsive to a fourth input, selecting one of the client nodes from the plurality of client nodes in the network topology view;

responsive to a fifth input, sending a request to the selected client node for additional node information;

receiving the additional node information; and presenting the additional node information on a display device.

15. The non-transitory computer-readable storage medium of claim 13, wherein the network topology view indicates routes and hops in the wireless sensor network.

16. The non-transitory computer-readable storage medium of claim 13, wherein the network topology view indicates timing and congestion in the wireless sensor network.

17. The non-transitory computer-readable storage medium of claim 14, wherein the additional node information includes event or state information of a stack in the selected client node.

18. The non-transitory computer-readable storage medium of claim 14, wherein sending the request to the selected client node for the additional node information and receiving the additional node information further comprises:

sending a memory read command to the selected client node with a memory address; and receiving one or more values from the memory address; and sending the one or more values to a hardware debugger or programmer coupled to a server device.

* * * * *